(12) United States Patent
Kim

(10) Patent No.: US 8,437,806 B2
(45) Date of Patent: May 7, 2013

(54) MOBILE TERMINAL AND METHOD FOR DISPLAYING DATA IN MOBILE TERMINAL

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 619 days.

(21) Appl. No.: 12/717,114

(22) Filed: Mar. 3, 2010

(65) Prior Publication Data

US 2010/0227651 A1    Sep. 9, 2010

(30) Foreign Application Priority Data

Mar. 3, 2009 (KR) .......... 10-2009-0017906
Sep. 15, 2009 (KR) .......... 10-2009-0086814

(51) Int. Cl.
*H04W 88/02* (2009.01)
(52) U.S. Cl.
USPC ........ 455/566; 455/158.4; 455/574; 345/173; 345/1.1; 345/211
(58) Field of Classification Search .......... 455/566, 455/575.1, 575.2, 575.3, 575.4, 575.8, 557, 455/66.1, 403, 550.1, 572, 574, 556.1, 158.4; 345/156, 158, 173, 204, 1.1, 30, 212, 1.3, 345/2.1, 3.4, 5, 87, 88, 104, 211; 348/14.02, 348/375, 333.06, 14.2; 136/244, 246
See application file for complete search history.

(56) References Cited

U.S. PATENT DOCUMENTS

| | | | |
|---|---|---|---|
| 7,460,885 B2* | 12/2008 | Ikeda et al. ........ | 455/556.1 |
| 8,195,243 B2* | 6/2012 | Kim et al. ........ | 455/566 |
| 8,233,863 B2* | 7/2012 | Kim ........ | 455/158.4 |
| 2005/0140576 A1* | 6/2005 | Sawada et al. ........ | 345/30 |
| 2005/0287953 A1* | 12/2005 | Ikeda et al. ........ | 455/66.1 |
| 2006/0097955 A1* | 5/2006 | Kato ........ | 345/1.1 |
| 2006/0130889 A1* | 6/2006 | Li et al. ........ | 136/244 |
| 2006/0135198 A1* | 6/2006 | Lee ........ | 455/550.1 |
| 2007/0103385 A1* | 5/2007 | Lian et al. ........ | 345/1.1 |
| 2007/0273609 A1* | 11/2007 | Yamaguchi et al. ........ | 345/1.1 |
| 2008/0094025 A1 | 4/2008 | Rosenblatt et al. | |
| 2008/0143695 A1* | 6/2008 | Juenemann et al. ........ | 345/204 |
| 2008/0214239 A1* | 9/2008 | Hashimoto et al. ........ | 455/557 |
| 2008/0254822 A1 | 10/2008 | Tilley | |
| 2008/0259071 A1* | 10/2008 | Nemoto et al. ........ | 345/212 |
| 2009/0069056 A1* | 3/2009 | Lee et al. ........ | 455/566 |
| 2010/0216518 A1* | 8/2010 | McPhail et al. ........ | 455/567 |
| 2011/0090166 A1* | 4/2011 | Truter ........ | 345/173 |
| 2011/0098088 A1* | 4/2011 | Lu et al. ........ | 455/557 |
| 2011/0124376 A1* | 5/2011 | Kim et al. ........ | 455/566 |

FOREIGN PATENT DOCUMENTS

| WO | 2008/012727 | 1/2008 |
|---|---|---|
| WO | 2008/033876 | 3/2008 |

* cited by examiner

*Primary Examiner* — Tan Trinh
(74) *Attorney, Agent, or Firm* — Lee, Hong, Degerman, Kang & Waimey

(57) ABSTRACT

A mobile terminal disposed with electronic paper and a method for displaying data in the mobile terminal are disclosed, wherein the mobile terminal comprises: a first display including a light emitting display; a second display including an electronic paper; and a controller configured to turn off the first display and to allow data to be displayed on the second display if a power event occurs.

28 Claims, 17 Drawing Sheets

(a)    (b)

MOBILE TERMINAL AND METHOD FOR DISPLAYING DATA IN MOBILE TERMINAL

CROSS-REFERENCE TO RELATED APPLICATIONS

Pursuant to 35 U.S.C. §119(a), this application claims the benefit of earlier filing date and right of priority to Korean Patent Application Nos. 10-2009-0017906, filed on Mar. 3, 2009, and 10-2009-0086814, filed on Mar. 3, 2009 an 4 Sep. 15, 2009, the contents of which are all hereby incorporated by reference herein in their entirety.

BACKGROUND OF THE DISCLOSURE

1. Field

The present disclosure relates to a mobile terminal disposed with electronic paper and a method for displaying data in a mobile terminal.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts. The recent mobile terminals as multimedia have been improved to have various functions, in addition to the intrinsic communicating functions.

The mobile terminal generally employs an LCD (Liquid Crystal Diode) for a display, where an OLED (Organic Light Emitting Diode) has been used recently.

However, the conventional mobile terminal suffers from a disadvantage in that a display is turned off to disable a user to check data stored in the mobile terminal if power is turned off.

SUMMARY

In one general aspect of the present disclosure, a mobile terminal comprises: a first display including a light emitting display; a second display including an electronic paper; and a controller configured to turn off the first display and to allow data to be displayed on the second display if a power event occurs In some exemplary embodiments, the mobile terminal may further comprise a light emitting unit disposed at one side of the second display, and the controller may be configured to display a wake-up data on the second display and to turn on the light emitting unit if a wake-up event occurs.

In some exemplary embodiments, the mobile terminal may further comprise a movement detecting sensor configured to detect a movement of the mobile terminal, and the controller may be configured to display on the second display at least part of the data displayed on the first display during detection of the movement.

In some exemplary embodiments, the mobile terminal may further comprise a solar cell configured to supply power to at least one of the mobile terminal of the second display, and the controller may be configured to display time on the second display, and to drive the second display using the solar cell if the power event occurs.

In some exemplary embodiments, the solar cell may be a transparent solar cell that is disposed on the first and second displays.

In some exemplary embodiments, the mobile terminal may further comprise a memory configured to store a predetermined menu, and the controller may be configured to controllably display a display object included in the executed menu on the second display during execution of the predetermined menu if the power event occurs.

In some exemplary embodiments, the mobile terminal may further comprise a user input unit for setting up a set-up display object to be displayed on the second display during occurrence of power event, and the controller may be configured to controllably display the set-up display object on the second display during the occurrence of power event.

In some exemplary embodiments, the predetermined menu may include at least one from a group consisting of an image call menu, a message reception menu, a telephone call, a mobile digital broadcasting menu, a camera album menu and an e-book menu.

In some exemplary embodiments, the display object may include at least one from a group consisting of an image photographed by a camera corresponding to the predetermined menu, a text message, a call information, an image received from a broadcasting module, an image file and an e-book data.

In some exemplary embodiments, the set-up display object may include at least one from a group consisting of a recent message receipt list, a most frequent phonebook (telephone number) list, a recent call list, my telephone information, a user description word, a map information, a schedule information, an image file, an Internet information.

In another general aspect of the present disclosure, a mobile terminal comprises: a first body including a first display formed with a light emitting display and a first connector; a second body including a second display formed with an electronic paper and a second connector configured to connect the first connector, wherein the second body is attachably and detachably connected to the first body through the first and second connectors; and a controller configured to turn off the first display and to allow data displayed on the first display to be displayed on the second display if the first body and the second body are detached.

In still another general aspect of the present disclosure, a method for displaying data in a mobile terminal comprises: providing a first display formed with a light emitting display; providing a second display formed with an electronic paper; checking whether a power event has occurred; and displaying part of data displayed on the first display on the second display if the power event has occurred.

In some exemplary embodiments, the method may further comprise turning on a light emitting unit disposed at one side of the second display if the power event has occurred.

In some exemplary embodiments, the method may further comprise: executing, by the mobile terminal, a predetermined menu; and displaying on the second display at least one display object among the data displayed as the predetermined menu.

In some exemplary embodiments, the method may further comprise; setting a set-up display object which is a data to be displayed on the second display if the power event is generated by a user set-up; and displaying the set-up display object on the second display.

In some exemplary embodiments, the predetermined menu may be at least one from a group consisting of an image communication menu, a message receipt menu, a call, a mobile digital broadcasting menu, a camera album menu and an electronic book menu.

In some exemplary embodiments, the display object may be at least one from a group consisting of an image photographed by a camera that is displayed in opposition to the predetermined menu, a text message, a call information, an image received through a broadcasting module, an image file and an electronic book data.

In some exemplary embodiments, the set-up display object may be at least one from a group consisting of a recent message reception list, a most frequent telephone number list, a recent call list, my telephone information, a user description word, a map information, a schedule information, an image file and an Internet information.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

A mobile terminal according to the present disclosure will be described in detail with reference to the accompanying drawings.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals such as stationary terminals that include digital TVs and desktop computers, the details of which are well known to the skilled in the art.

Figure 1:
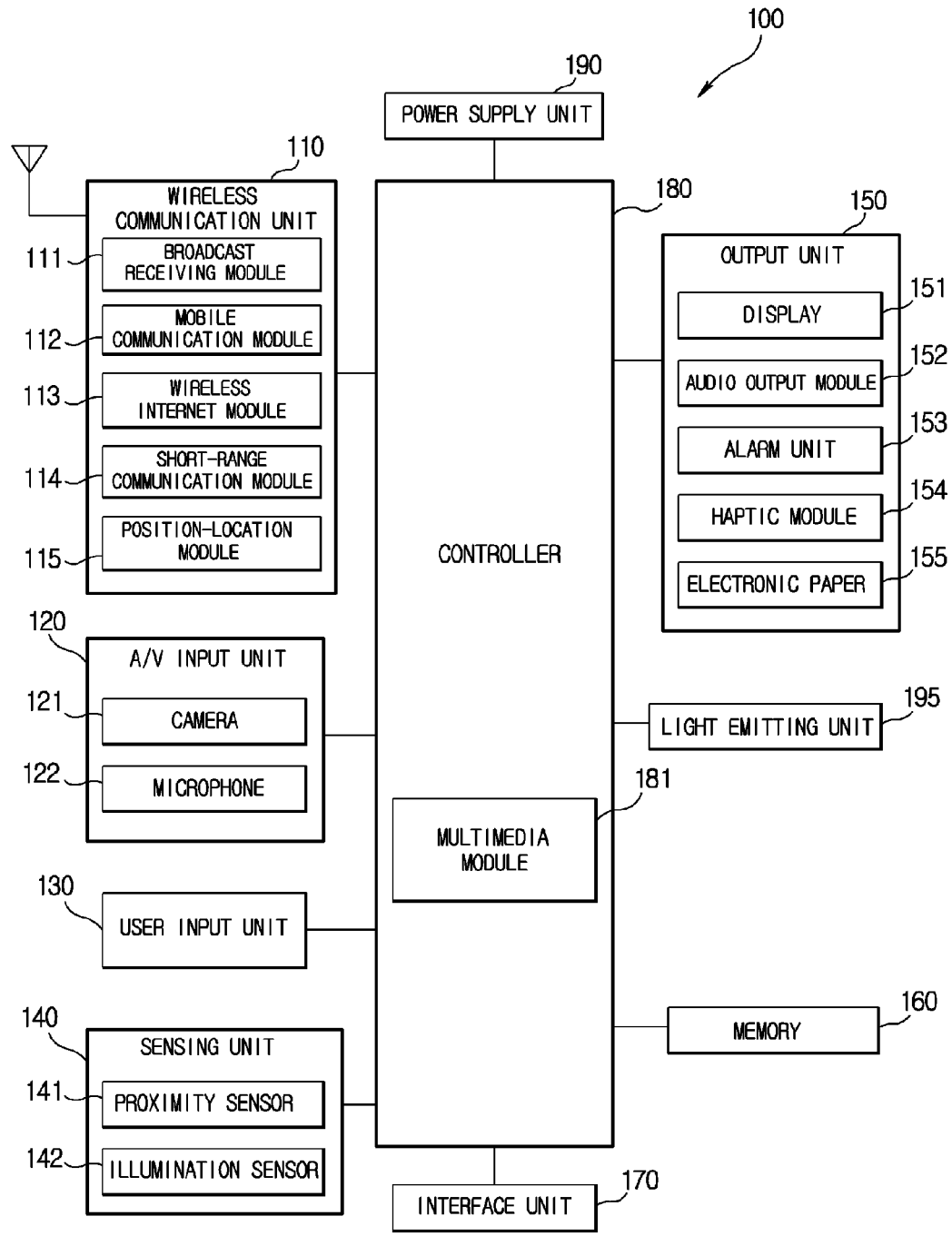
FIG. 1 is a block diagram of a mobile terminal according to an exemplary embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180, a power supply 190 and a light emitting unit 195.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located.

In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing server via a broadcast channel.

The broadcast channel may include a satellite channel and a terrestrial channel. The broadcast managing server may refer to a system that transmits a broadcast signal and/or broadcast associated information to a mobile terminal. The broadcasting signal may include not only a TV broadcasting signal, a radio signal, a data broadcasting signal, but also a broadcasting signal in which a TV broadcasting signal or a radio signal is combined with a data broadcasting signal.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station, an external terminal, a server). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 is a module that may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

Referring to FIG. 1, the audio/video (A/V) input unit 120 may provide audio or video signal input to the mobile terminal 100. The A/V input unit 120 may include a camera 121 and a microphone 122. The camera 121 may receive and process image frames of still pictures and/or video. The processed image frames may be displayed on the display 151.

The image frames processed by the camera 121 may be stored in the memory 160 or may be transmitted to the outside through the wireless communication unit 110. At least two or more cameras 121 may be provided in the mobile terminal according to use environment.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. At least two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141 and a luminance sensor 142.

The output unit 150 may generate an output relevant to a sight sense, an auditory sense, a tactile sense and/or the like. The output unit 150 may include a display 151, an audio output module 152, an alarm 153, a haptic module 154 and an electronic paper 155.

The display 151 may display (output) information processed by the terminal 100. For example, in case that the terminal is in a call mode, the display 151 may display a user interface (UI) or a graphic user interface (GUI) associated with a call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may be a light emitting display in terms of a fact that a self light emitting device is used, which is intended to distinguish from an electronic paper 155 to be described later.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two or more displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and/or the like.

The touch sensor 142 may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor 142, signal(s) corresponding to the touch input may be transferred to a touch controller. The touch controller may process the signal(s) and then transfer corresponding data to the controller 180. The controller 180 may therefore know which portion of the display 151 is touched.

Referring to FIG. 1, a proximity sensor 141 may be provided at an inner area of a mobile terminal wrapped by the touch screen or at a vicinity of the touch screen. The proximity sensor 141 is a sensor capable of detecting an object approaching a predetermined detection surface or whether there is an object nearby using an electromagnetic force or infrared, dispensing with a mechanical contact. The proximity sensor has a longer life than that of a contact sensor, such that its utility is higher.

Examples of the proximity sensor may include a transmissive photo sensor, direct reflective photo sensor, a mirror reflective photo sensor, a high frequency oscillating proximity sensor, a capacitive proximity sensor, a magnetic proximity sensor, an infrared proximity sensor and the like. In the case the touch screen is capacitive type, the proximity of a pointer may be detected by changes of electric fields caused by proximity of the pointer. The touch screen (touch sensor) therefore may be classified as a proximity sensor.

For the convenience sake, a case where a pointer is recognized to be proximately placed on a touch screen without touching the touch screen is called a "proximity touch" and a case the pointer completely touches the touch screen is called a "contact touch". The position proximity-touched by the pointer on the touch screen is a position vertically corresponded by the pointer to the touch screen when the pointer proximity-touches the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The electronic paper 155 may be called an e-paper as a display device applied with a commonly-used ink to paper. Unlike the conventional flat display using a backlight for illuminating pixels, the electronic paper uses a reflective light just like the commonly-used paper. Therefore, characters and pictures may be displayed without consumption of electricity after the picture is changed.

Furthermore, the electronic paper may be folded or unfolded unlike the flat display. The description of the electronic paper will be described in detail later.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100.

The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separately from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

The light emitting unit 195 may be provided at one side of the electronic paper to automatically emit light in a case a predetermined data is displayed on the electronic paper 155. The light emitting unit 195 may use a light emitting diode (LED). Meanwhile, in a case an illumination value of a predetermined level or less is measured and data is displayed on the electronic paper 155, the light emitting unit may be configured to turn on.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
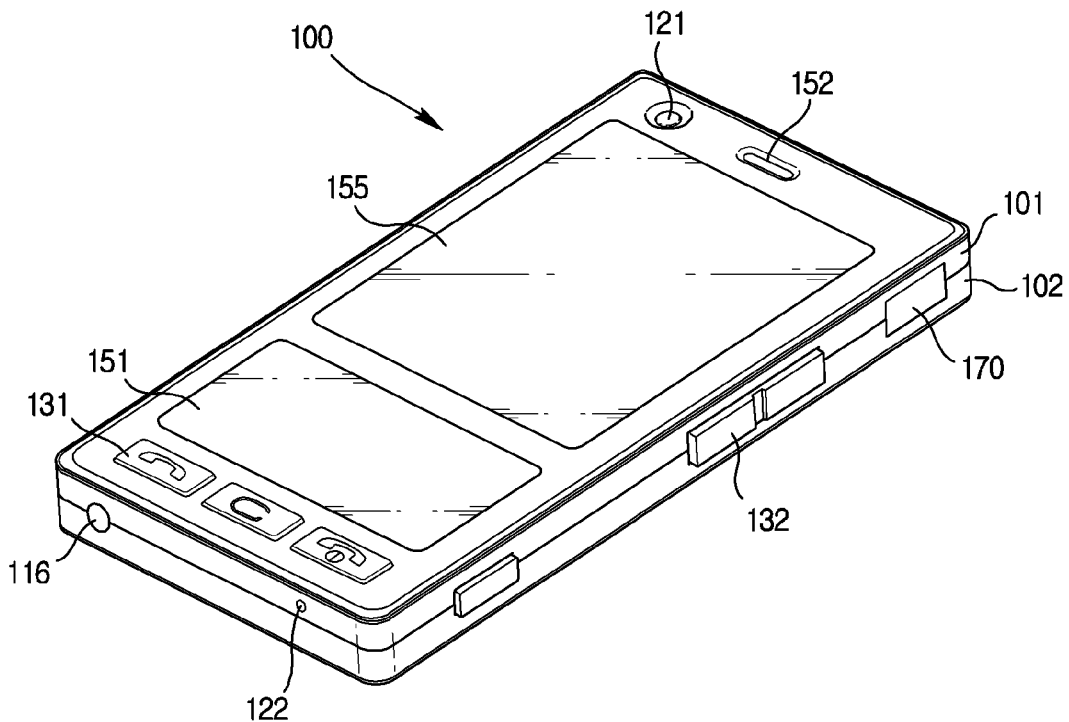
FIG. 2a is a front perspective view of a mobile terminal according to an exemplary embodiment of the present disclosure.

FIG. 2a is a front perspective view of a mobile terminal according to an example of the present invention. Other embodiments, configurations and arrangements may also be provided.

As shown in FIG. 2a, the mobile terminal 100 may include a bar type terminal body. Embodiments of the mobile terminal may be implemented in a variety of different configurations. Examples of such configuration may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the electronic paper 155, the audio output unit 152, the camera 121, user input units 130/131/132, the microphone 122, the interface unit 170 and the like may be provided on the terminal body, and more particularly on the front case 101. An arranged relation between the electronic paper 195 and the display 151 will be described later.

The electronic paper 155 and the display 151 may occupy most of a main face of the front case 101. The audio output module 152 and the camera 121 may be provided at an area adjacent to one end portion of the electronic paper 155, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be generally called a manipulating portion and may adopt any mechanism of a tactile manner that enables a user to perform a manipulation action by experiencing a tactile feeling.

Contents inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for switching to a touch recognizing mode of the display 151 or the like may be inputted to the second manipulating unit 132.

Figure 2B:
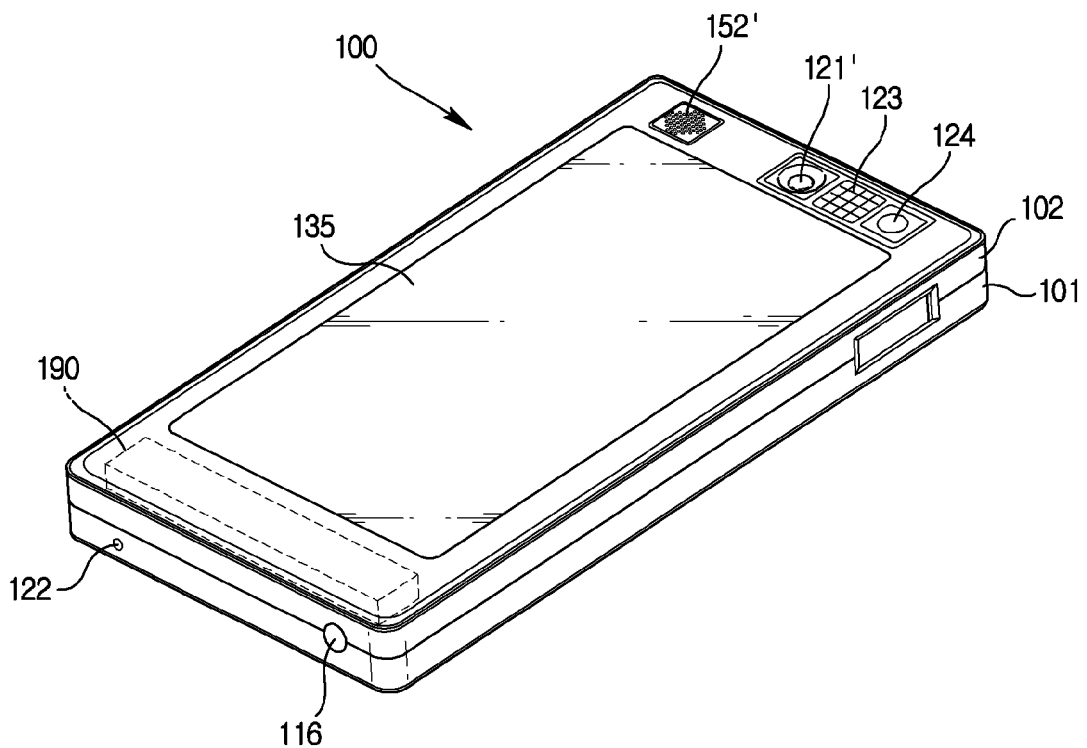
FIG. 2b is a rear perspective view of a mobile terminal according to an exemplary embodiment of the present disclosure.

FIG. 2b is a perspective diagram of a backside of the mobile terminal shown in FIG. 2a. Other embodiments, configurations and arrangements may also be provided.

As shown in FIG. 2b, a camera 121' may be additionally provided on a backside of the terminal body, and more particularly on the rear case 102. The camera 121' may have a photographing direction that is substantially opposite to a photographing direction of the camera 121 (shown in FIG. 2a) and may have pixels differing from pixels of the camera 121.

For example, the camera 121 may have a lower number of pixels to capture and transmit a picture of user face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be embedded within the terminal body. Alternatively, the power supply 190 may be detachably and attachably connected to the terminal body.

FIG. 2b also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

An interacting method between the display 151 and the touch pad 135 will be described with reference to FIG. 3.

Figure 3:
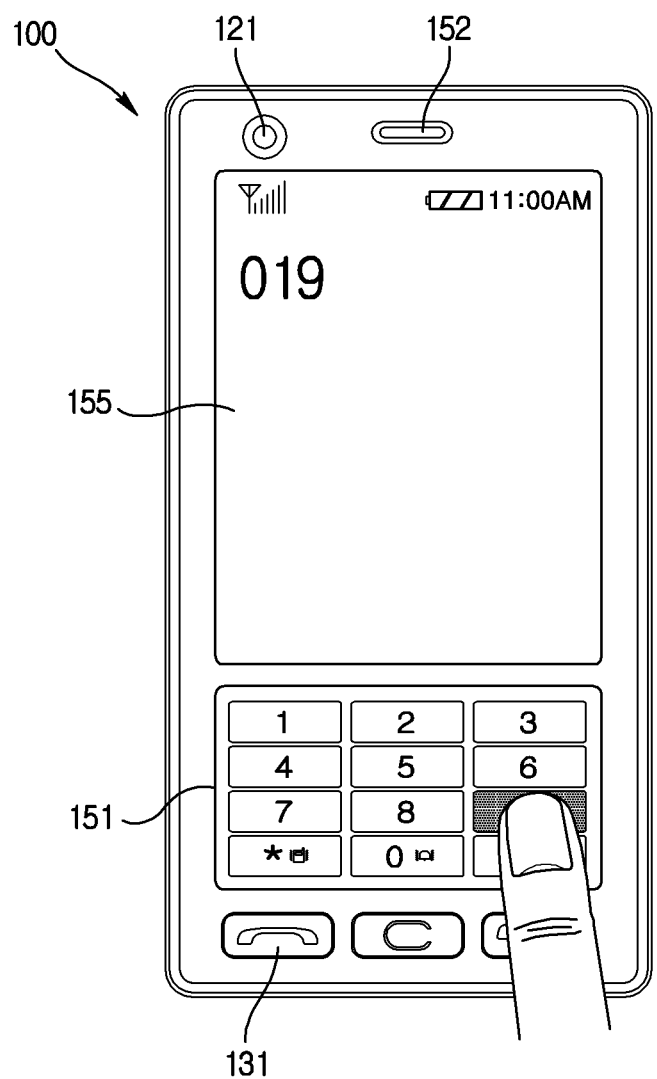
FIG. 3 is a front view of a mobile terminal for describing an operation status according to the present disclosure.

FIG. 3 is a front view of a mobile terminal for describing an operation status according to the present disclosure.

The electronic paper 155 may be displayed with various types of visual information. The visual information may be displayed in a type of a letter, a number, a symbol, a graphic or an icon.

At least one of the letter, the number, the symbol, the graphic and the icon may be displayed in a predetermined array to be implemented in the form of a keypad such that this information can be inputted. The keypad is so called a "soft key".

FIG. 3 illustrates an input of a touch applied to the soft key through the front surface of the terminal body.

A virtual keypad is outputted to the touch screen (the display 151), where the virtual keypad is a soft key displayed with numerals for inputting telephone numbers. In a case the soft key is touched, numerals corresponding to the touched soft key are displayed on the electronic paper 155. In a case a first manipulation unit 131 is manipulated, a call connection is attempted to a telephone number displayed on the electronic paper 155.

Figure 4:
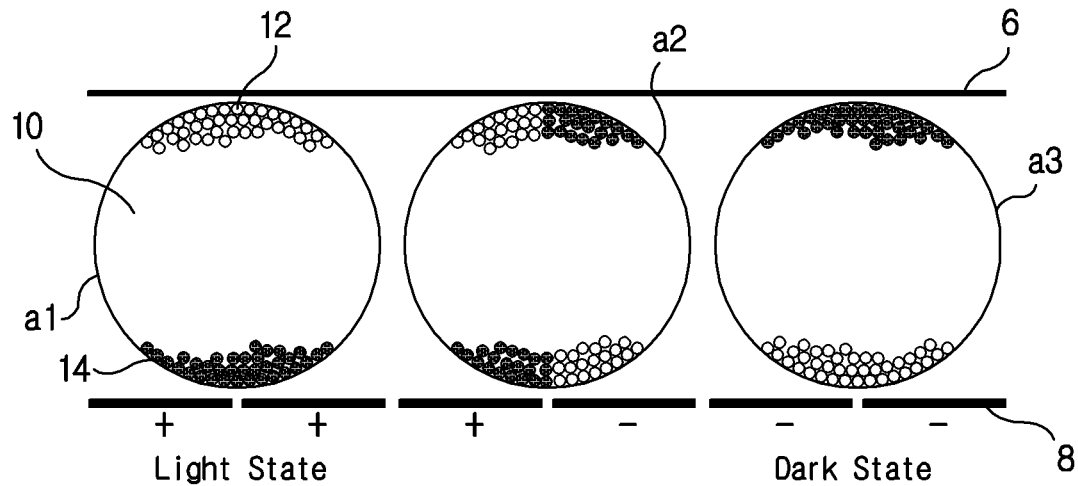
FIG. 4 is a schematic view for displaying a principle of an electronic paper according to the present disclosure.

FIG. 4 is a schematic view for explaining an operation principle of an electronic paper mounted on the mobile terminal according to the present disclosure. That is FIG. 4 illustrates a cross-sectional view of each electronic ink micro capsule (a1, a2, a3). As shown in FIG. 4, an electronic paper (155) includes a top transparent electrode 6, a bottom electrode 8 and an electronic ink capsule 10. The electronic ink capsule is disposed white pigment chips 12 charged with positive electricity and black pigment chips 14 charged with negative electricity.

In a case the bottom electrode 8 is charged with positive electricity, the white chips 12 move toward the upper transparent electrode 6 to make the electronic ink capsules 10 white. Alternatively, in a case the bottom electrode 8 is charged with negative electricity, the black chips 14 move toward the upper transparent electrode 6 to make the electronic ink capsules 10 black.

The electronic paper 155 including lots of electronic ink capsules 10 also functions as a display. Furthermore, one electronic ink capsule may display black and white at the same time. In this case, one half of pixels in the bottom electrode 8 may be charged with negative, and the other half of pixels in the bottom electrode 8 may be charged with positive.

As noted above, the electronic paper 155 is a new type of display using electronic ink. Furthermore, the electronic paper can implement color moving pictures through combination of polymer coating technique and liquid chemical. The electronic paper can display comic strips or real movies of 30 frames per second.

Now, a method for displaying data in a mobile terminal according to the present disclosure will be described with reference to FIGS. 5 to 8.

First Example

Figure 5:
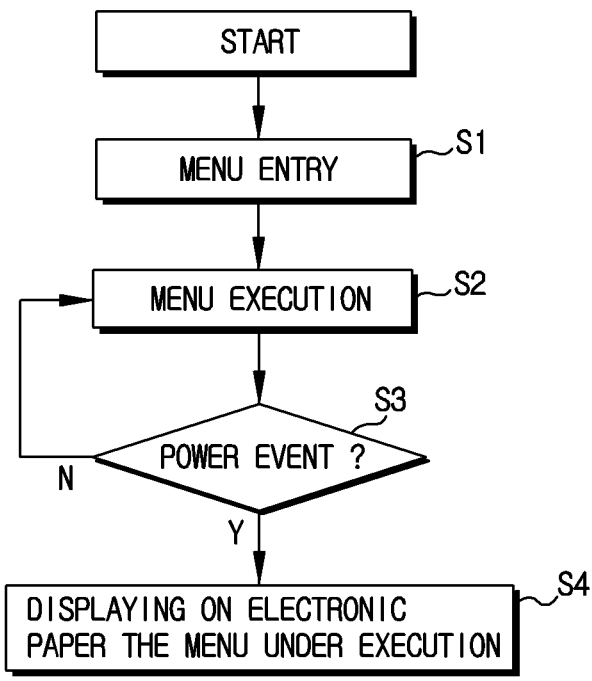
FIG. 5 is a flowchart for describing a first exemplary embodiment of the present disclosure in a method for displaying data in a mobile terminal according to the present disclosure.

FIG. 5 is a flowchart for describing a first exemplary embodiment of the present disclosure in a method for displaying data in a mobile terminal according to the present disclosure.

Referring to FIG. 5, a user inputs a predetermined menu through the user input unit 130 (S1). A data resultant from the menu input is displayed on the light emitting display 151 which is a first display or the electronic paper 155, The user executes the menu through the user input menu 130 while the menu is being displayed (S2). The controller 180 monitors the power supply 190 while the menu is being executed to check whether power is sufficient enough (S3).

If a power event occurs due to insufficient power, the controller 180 controls the electronic paper in such a manner that at least part of the executed screen is displayed on the electronic paper (S4). The meaning of power event defines that a warning message is generated to the power supply of the mobile terminal and may include a power-off event, a power-insufficient event and a power saving event. Furthermore, the power event may also include the change of the display to ON status (Wake-up event) by a predetermined event occurrence while the display is turned off (i.e., the status of the mobile terminal being closed to turn off the display).

According to the first example, the electronic paper is used as a display to enable a longer use of the mobile terminal in case the mobile terminal is short of power, or a sleep event occurs. More detailed exemplary embodiment of the first example will be given later with reference to the accompanying drawing.

Second Example

Figure 6:
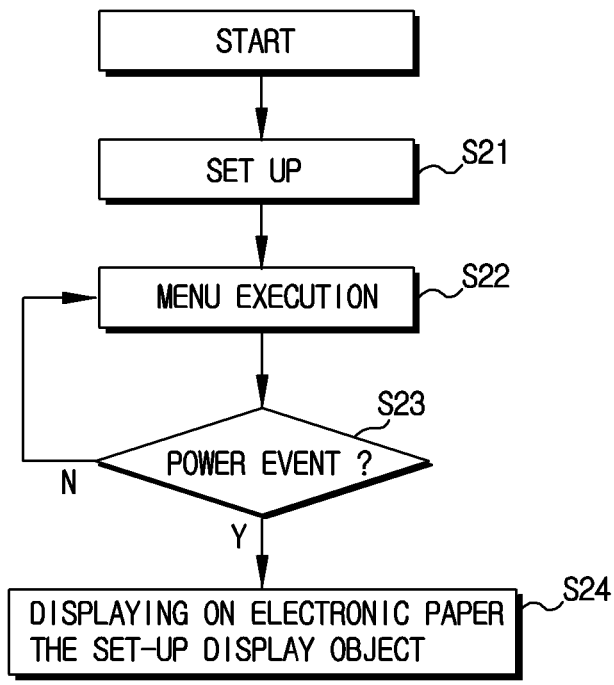
FIG. 6 is a flowchart for describing a second exemplary embodiment of the present disclosure in a method for displaying data in a mobile terminal according to the present disclosure.

FIG. 6 is a flowchart for describing a second exemplary embodiment of the present disclosure in a method for displaying data in a mobile terminal according to the present disclosure.

Referring to FIG. 6, the user enters a predetermined menu through the user input unit 130 (S21). The menu is displayed on the display 151 or the electronic paper 155. The user executes the menu through the user input unit 130 while the menu is being displayed (S22).

The controller 180 monitors the power supply 190 while the menu is being executed to check whether power is sufficient enough (S23).

If a power event occurs due to insufficient power, the controller 180 controls the electronic paper in such a manner that a set-up display object is displayed on the electronic paper (S24). The meaning of power event defines that a warning message is generated to the power supply of the mobile terminal and may include a power-off event, a power-insufficient event and a power saving event. Examples of the display objects will be described later with reference to accompanying drawing.

Third Example

Figure 7:
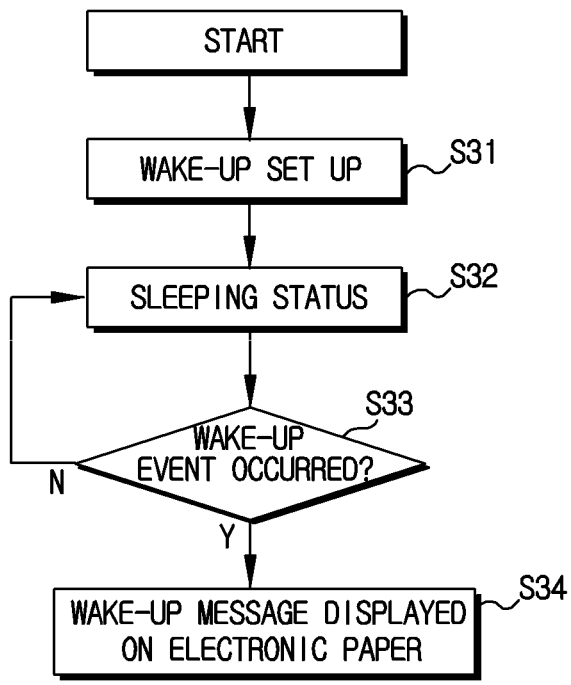
FIG. 7 is a flowchart for describing a third exemplary embodiment of the present disclosure in a method for displaying data in a mobile terminal according to the present disclosure.

FIG. 7 is a flowchart for describing a third exemplary embodiment of the present disclosure in a method for displaying data in a mobile terminal according to the present disclosure.

A user executes a set-up providing a priority to the electronic paper 155 through the user input unit 130 (S31). That is, a set-up is executed to display an event message on the electronic paper 155 during occurrence of event.

Successively, in a case the mobile terminal enters a sleep status (i.e., the display being turned off to allow a call and a text message to be received) (S32), and a wake-up event is generated (S33), the electronic paper 155 is displayed with a message resultant from the wake-up event as set up (S34). The wake-up event may include a text message reception, a call signal reception, a slide up, a folder up and a side key input.

According to the third example, the electronic paper is given a priority of data display over the light emitting display to thereby save power consumption and to reinforce the portability of mobile terminal.

Fourth Example

Figure 8:
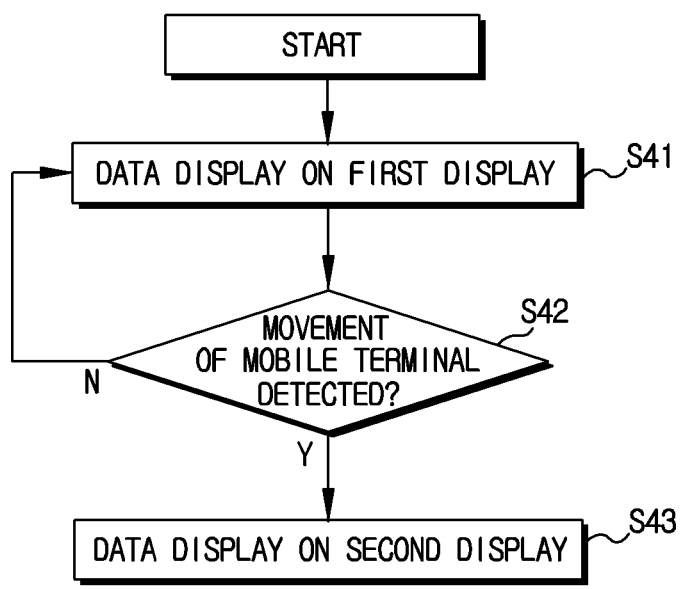
FIG. 8 is a flowchart for describing a fourth exemplary embodiment of the present disclosure in a method for displaying data in a mobile terminal according to the present disclosure.

FIG. 8 is a flowchart for describing a fourth exemplary embodiment of the present disclosure in a method for displaying data in a mobile terminal according to the present disclosure.

First, data is displayed on the light emitting display which is a first display 151(S41). In a case a movement signal of the mobile terminal is generated from the sensing unit 140 of the mobile terminal while the data is being displayed on the first display 151 (S42), at least part of the data displayed on the first display 151 is displayed on the second display 155 which is the electronic paper (S43).

According to the fourth example of the present invention, the display that is displayed according to movement of the mobile terminal may be changed.

Figure 9:
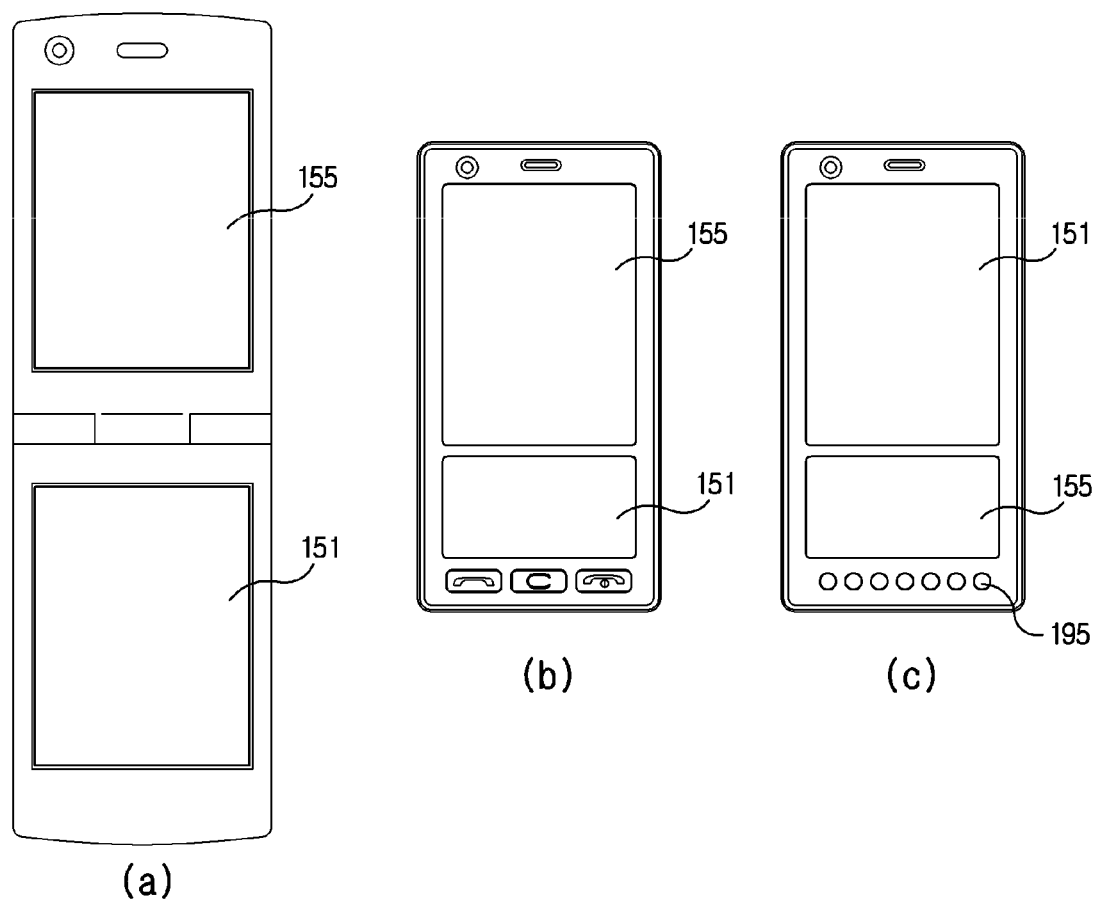
FIG. 9 is a front view for describing an exterior look of a mobile terminal according to the present disclosure.

Now, type of mobile terminal will be described with reference to FIG. 9.

FIGS. 9a, 9b and 9c illustrate a front perspective view of a mobile terminal according to the present invention.

FIG. 9a illustrates a folder type mobile terminal that is applied with the exemplary embodiment of the present invention.

As depicted in FIG. 9a, a folder type mobile terminal is disposed with electronic paper 155 at an upper folder, and a lower folder is disposed with a light emitting display 151. Alternatively, an inner display of the upper folder and the lower folder may include a light emitting display, and an outside of the upper folder is arranged with electronic paper.

FIG. 9b illustrates a bar type mobile terminal, where the light emitting display 151 may be arranged at a lower lateral surface of the electronic paper 155. FIG. 9c illustrates the light emitting display 151 (first display) disposed at an upper lateral surface of the electronic paper 155. A light emitting unit 195 is disposed at a lower lateral surface of the electronic paper 155 configured to illuminate the electronic paper. In a case the light emitting unit is turned on, the data displayed on the electronic paper can be checked using the light of the light emitting unit.

Now, detailed exemplary embodiments of the first example will be described with reference to FIGS. 10 to 12.

Figure 10:
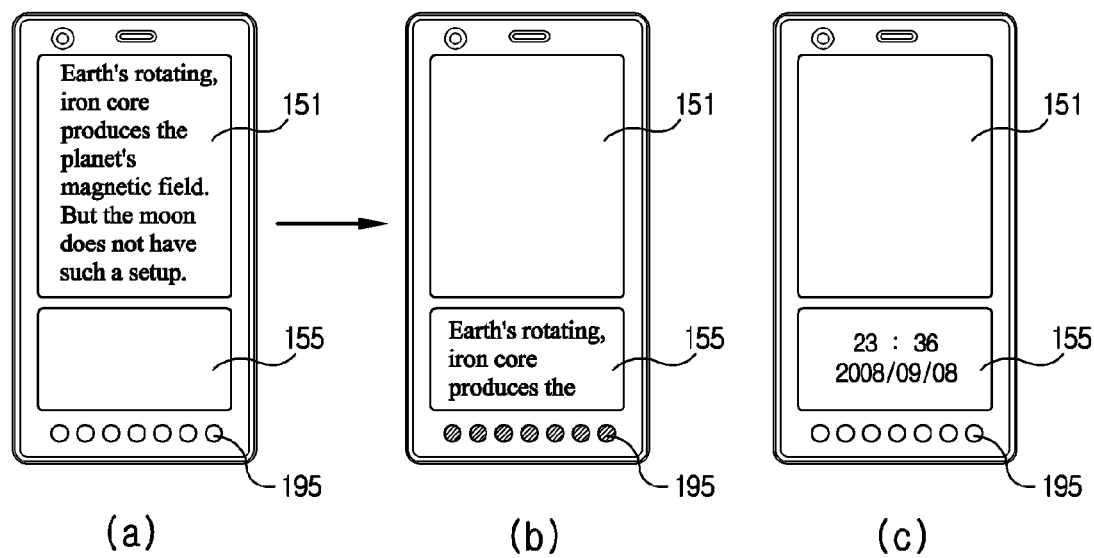
FIG. 10 is a schematic view for describing a first example of a mobile terminal in which a method for displaying data in the mobile terminal is applied according to the present disclosure.
Figure 11:
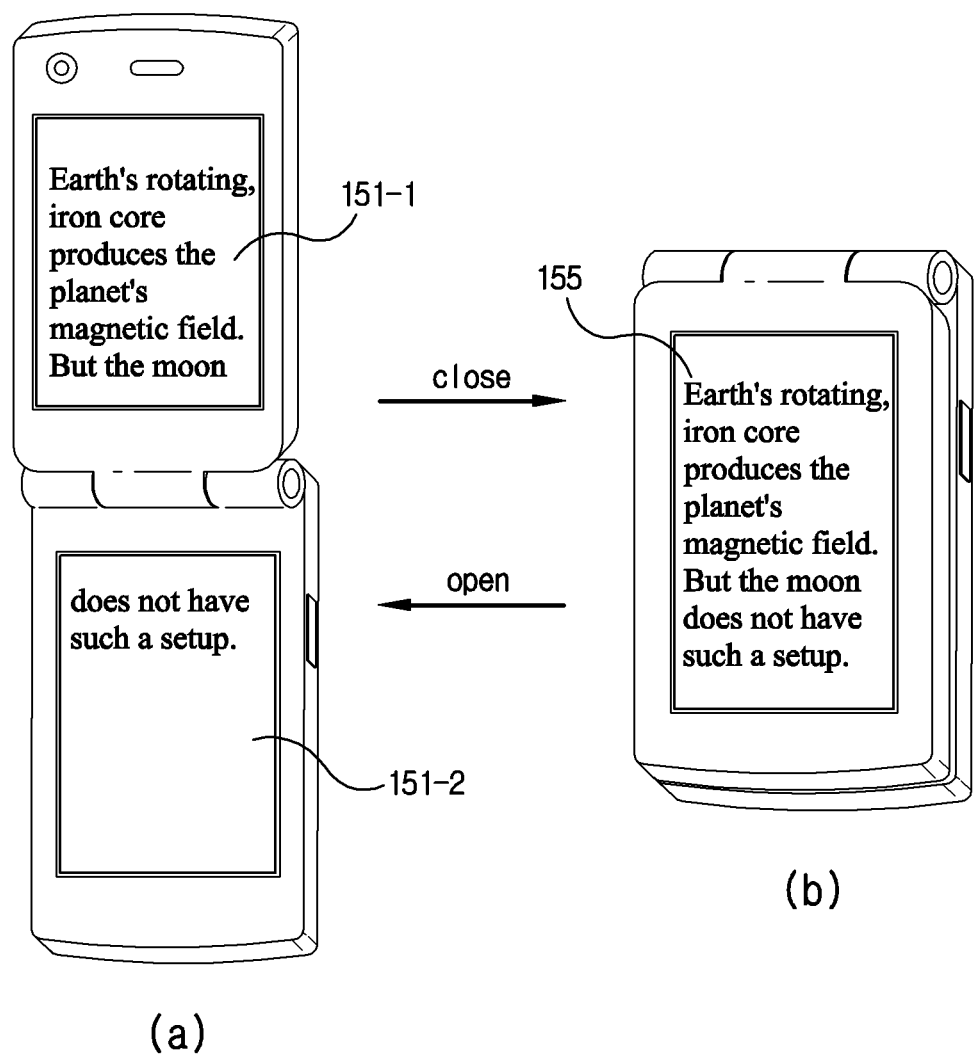
FIG. 11 is a schematic view for describing a second example of a mobile terminal in which a method for displaying data in the mobile terminal is applied according to the present disclosure.
Figure 12:
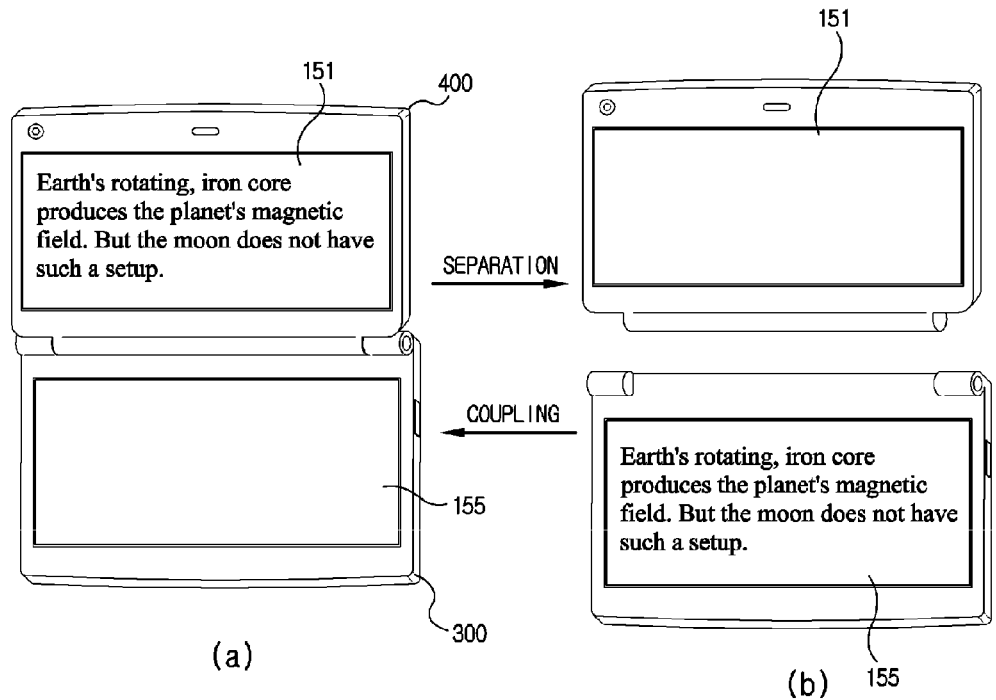
FIG. 12 is a schematic view for describing a third example of a mobile terminal in which a method for displaying data in the mobile terminal is applied according to the present disclosure.
Figure 13:
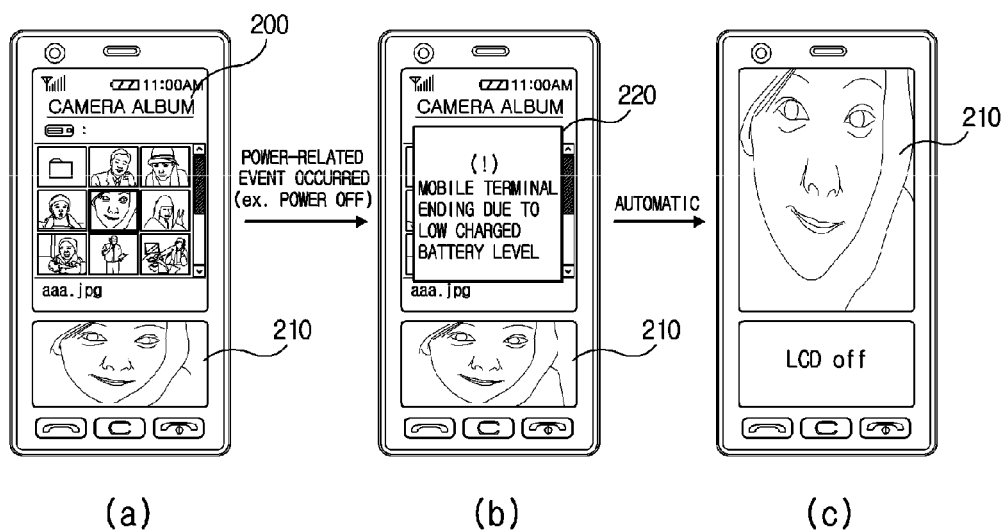
FIGS. 13a, 13b and 13c are schematic views illustrating a method for displaying data in a mobile terminal that is applied to an example of album menu according to the present disclosure.
Figure 14:
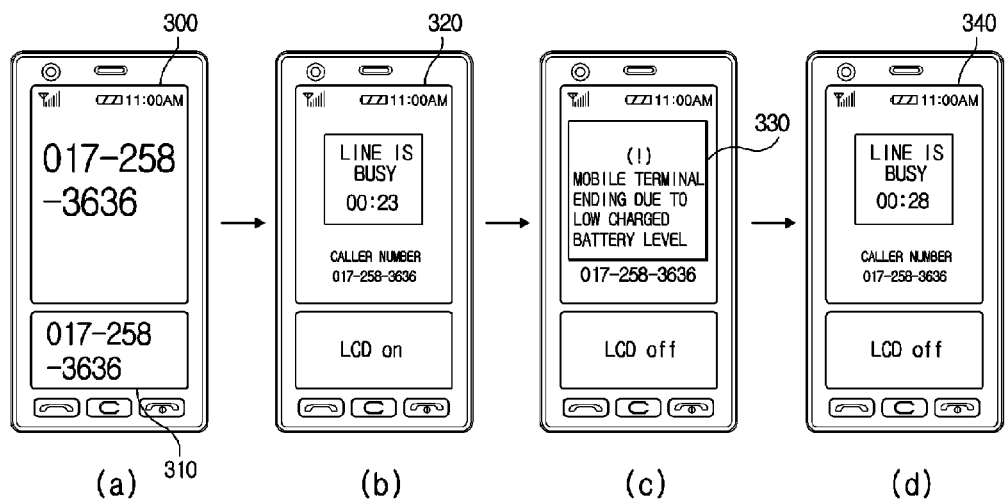
FIGS. 14a to 14d are schematic views illustrating a method for displaying data in a mobile terminal that is applied to an example of a call according to the present disclosure.
Figure 15:
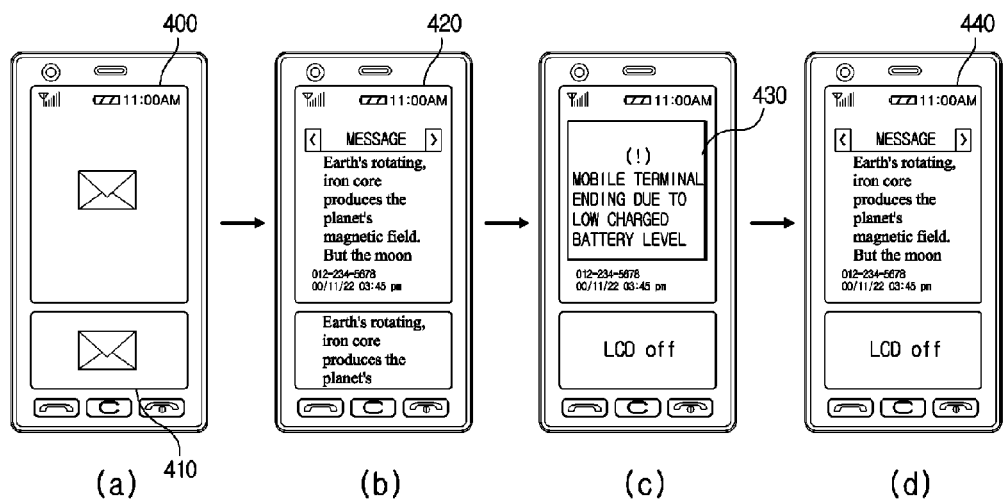
FIGS. 15a to 15d are schematic views illustrating a method for displaying data in a mobile terminal that is applied to an example of a text message check according to the present disclosure.
Figure 16:
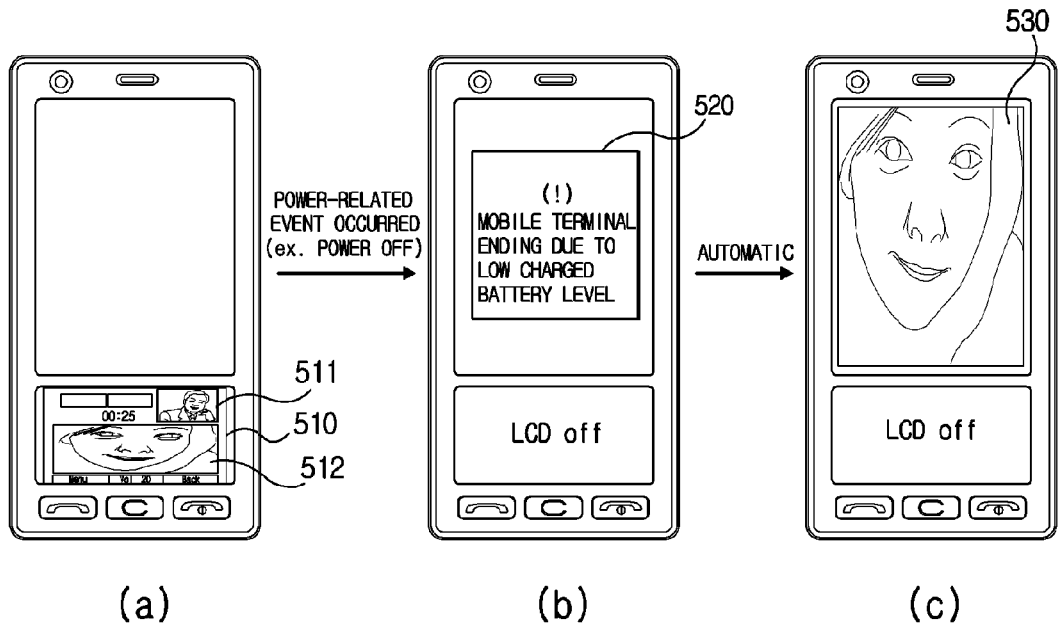
FIGS. 16a to 16c are schematic views illustrating a method for displaying data in a mobile terminal that is applied to an example of a video phone call according to the present disclosure.
Figure 17:
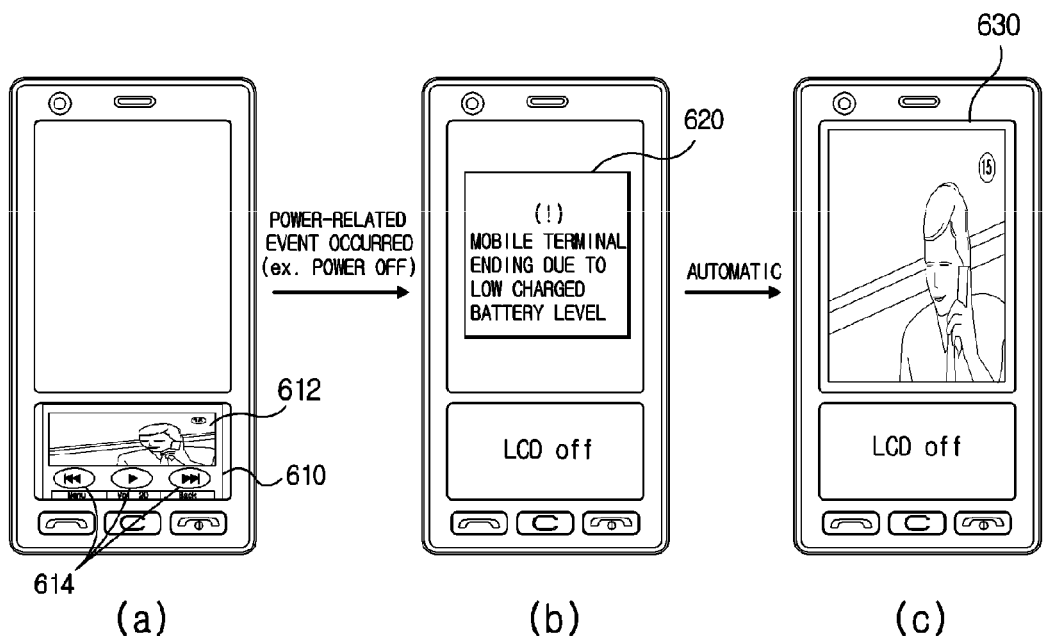
FIGS. 17a to 17c are schematic views illustrating a method for displaying data in a mobile terminal that is applied to an example of a digital broadcasting according to the present disclosure.
Figure 18:
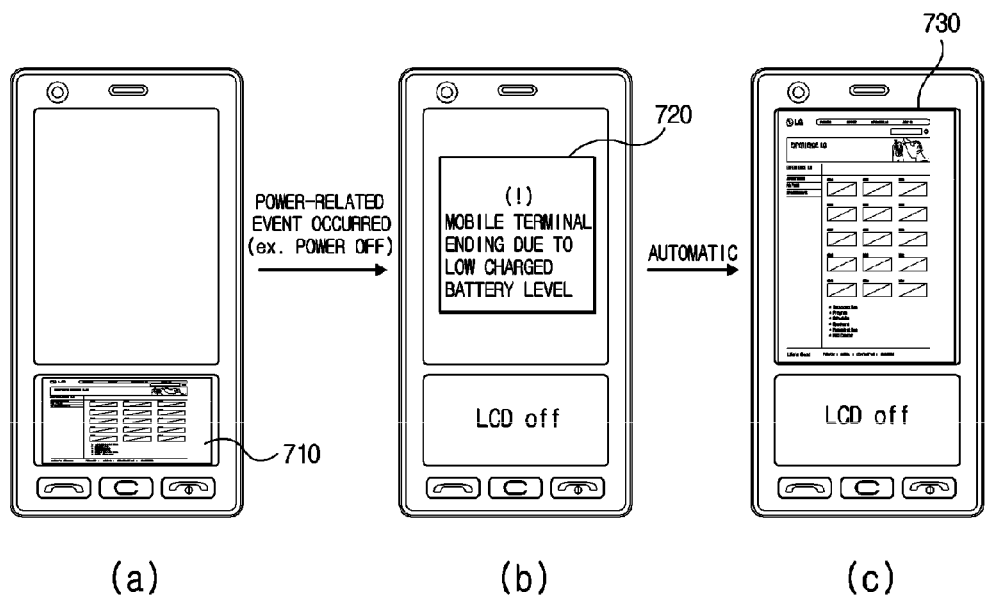
FIGS. 18a to 18c are schematic views illustrating a method for displaying data in a mobile terminal that is applied to an example of an Internet execution according to the present disclosure.
Figure 19:
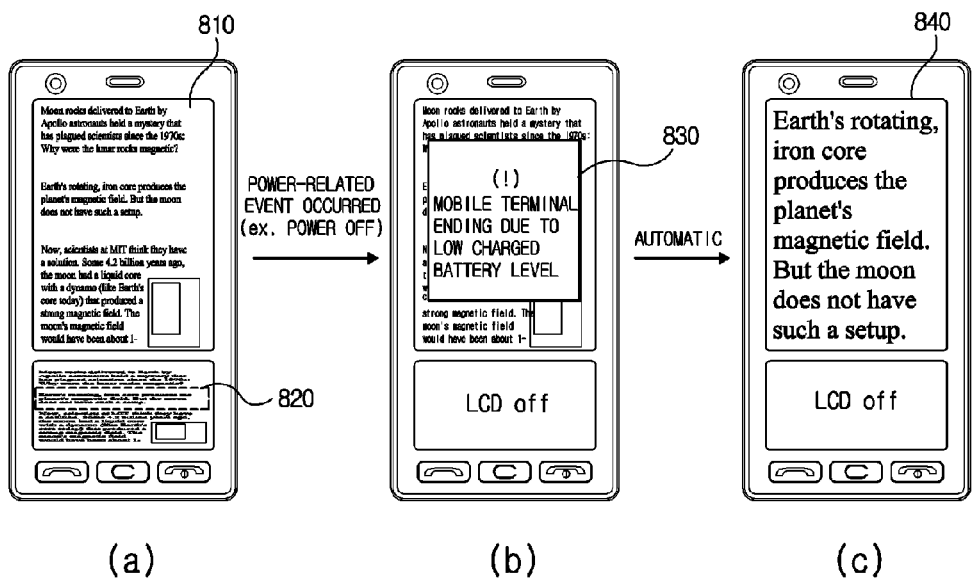
FIGS. 19a to 19c are schematic views illustrating a method for displaying data in a mobile terminal that is applied to an example of an e-book according to the present disclosure.
Figure 20:
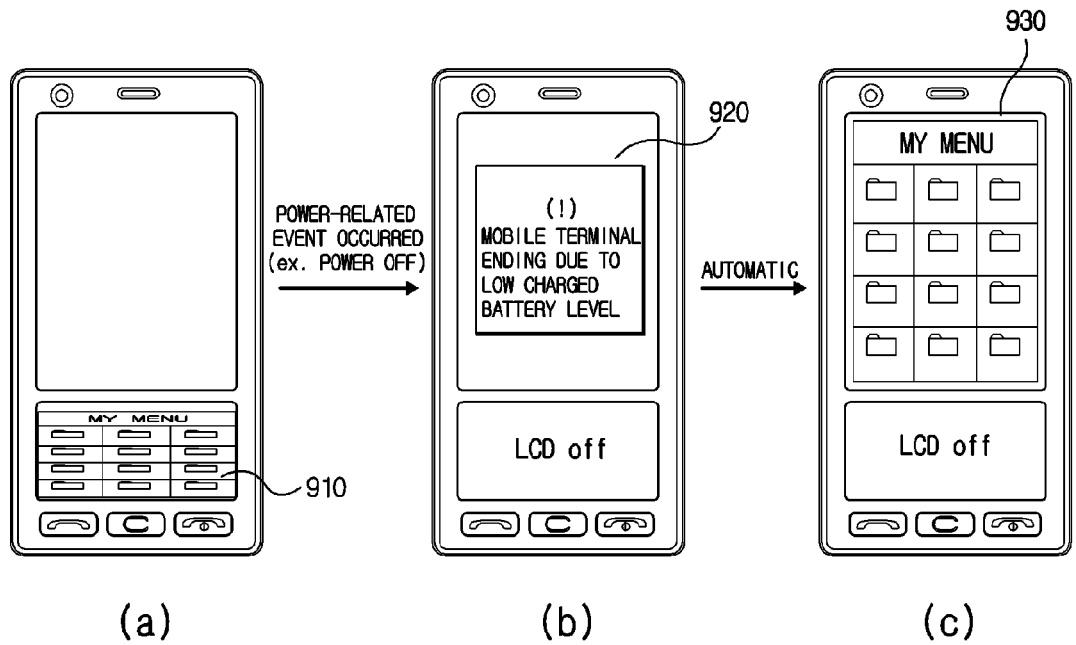
FIGS. 20a to 20c are schematic views illustrating a method for displaying data in a mobile terminal that is applied to an example of a telephone menu according to the present disclosure.

FIG. 10 is a schematic view for describing a first example of a mobile terminal in which a method for displaying data in the mobile terminal is applied according to the present disclosure, FIG. 11 is a schematic view for describing a second example of a mobile terminal in which a method for displaying data in the mobile terminal is applied according to the present disclosure, and FIG. 12 is a schematic view for describing a third example of a mobile terminal in which a method for displaying data in the mobile terminal is applied according to the present disclosure.

First Exemplary Embodiment

FIG. 10 is a schematic view for describing a first example of a mobile terminal in which a method for displaying data in the mobile terminal is applied according to the present disclosure.

As shown in FIG. 10a, the bar type mobile terminal is disposed thereon with the display (151. first display), a second display (electronic paper) is disposed underneath the first display and a light emitting unit 195 is arranged at one side of the electronic paper 155. The first display 151 is displayed with a current electronic book data. The book data is just an example and other types of data including image data may be displayed.

In a case a power event occurs while the electronic book data is displayed on the first display 151, the first display 151 is turned off to display the electronic book data displayed on the first display 151 on the second display 155. At the same time, the light emitting unit 195 is turned on to enable the user to check the electronic book data displayed on the electronic paper (second display 155) in a dark environment.

In a case a movement of the mobile terminal is detected using a gyro sensor instead of the power event, at least part of the data displayed on the first display 151 may be moved and displayed on the second display. That is, in a case the user taps or rotates the mobile terminal, at least part of the data displayed on the first display may be moved and displayed on the second display by the movement of the mobile terminal.

Furthermore, in a case the mobile terminal is in a sleep status, and a wake-up event is generated, the wake-up message may be so set up as to be displayed on the second display on the priority base. Based on the user set-up, the second display 155 is given the priority during the occurrence of wake-up event, and the wake-up message is displayed on the second display 155. At this time, the wake-up event may include a text message reception, a call reception, a slide up, a folder up or a side key input.

Meanwhile, the mobile terminal according to the present invention may further include a solar cell. That is, as a driving source for the electronic paper, the electronic paper may display data of the electronic paper using the solar cell in addition to the built-in battery. The solar cell may be used to charge the battery of the mobile terminal. In a case the solar cell is a transparent solar cell, the transparent solar cell may be arranged either on the first display or the second display.

Meanwhile, in a case a power event is generated on the mobile terminal 100, the first display 151 is turned off while the second display 155 may be displayed with a watch widget such as a RTC (real time clock), as shown in FIG. 10c. The built-in battery or the solar cell of the mobile terminal may be used for the RTC power. Even if the power-off event is generated, the RTC may be driven using the built-in battery because a threshold value of power used for the RTC is lower than a voltage value configured to drive the controller 180 of the mobile terminal.

Second Exemplary Embodiment

FIG. 11 is a schematic view for describing a second example of a mobile terminal in which a method for displaying data in the mobile terminal is applied according to the present disclosure.

FIG. 11 illustrates data displayed on the electronic paper and the light emitting display based on a folder-up and a folder-close. The mobile terminal applied to the second exemplary embodiment is folder type terminal that includes an upper folder and a lower folder, and the upper folder and the lower folder are disposed therein with the light emitting displays 151-1, 151-2, and an exterior of the upper folder is displayed with the electronic paper 155.

As illustrated in FIG. 11a, the light emitting displays 151-1, 151-2 are respectively displayed with electronic book data (first electronic book data and second electronic book data).

In a case a folder-close event occurs under this circumstance, the electronic paper 155 is displayed with the first electronic book data and the second electronic book data being combined, as shown in FIG. 11b.

Alternatively, in a case a folder up event occurs while the folder is closed (see FIG. 11b), the electronic book data displayed on the electronic paper is split to be displayed on the upper folder and the lower folder of the light emitting display, as shown in FIG. 11a.

Third Exemplary Embodiment

FIG. 12 is a schematic view for describing a third example of a mobile terminal in which a method for displaying data in the mobile terminal is applied according to the present disclosure. FIG. 12 is a schematic view for describing data displayed on the electronic paper and the light emitting display based on whether the terminal body can be separated or combined in a separable/combinable mobile terminal.

The mobile terminal 100 applied to the third exemplary embodiment of the present invention is a separable terminal that includes a first body 300 formed with the electronic paper 155 and a second body 400 formed with the light emitting display 151, where the first and second bodies are disposed with a connector (not shown) configured to electrically combine the first and second bodies.

As illustrated in FIG. 12a, in a case the first and second bodies 300, 400 are electrically combined, the electronic book data is displayed on the light emitting display 151 of the second body 400. In a case the first and second bodies 300, 400 are electrically separated, the electronic paper 155 is displayed with the electronic book data displayed on the light emitting display 151 while the light emitting display is turned off, as shown in FIG. 12b.

Alternatively, in a case the first and second bodies 300, 400 are electrically combined, the electronic book data displayed on the electronic paper 155 is displayed on the light emitting display 151, as depicted in FIG. 12a.

At this time, the first body 300 may be disposed with a solar cell configured to supply power to the electronic paper, and the second body 400 may be disposed with a built-in battery configured to supply power to the light emitting display.

Now, a detailed application according to the second exemplary embodiment of the present invention will be described with reference to FIGS. 13 to 20. The detailed exemplary embodiments are described using a bar type mobile terminal for the convenience sake, the description is not limited thereto but it should be apparent to the skilled in the art that other types of mobile terminals such as the folder type, the flip-up type and swivel type mobile terminal may be applied.

FIGS. 13a, 13b and 13c are schematic views illustrating a method for displaying data in a mobile terminal that is applied to an example of album menu according to the present disclosure, FIGS. 14a to 14d are schematic views illustrating a method for displaying data in a mobile terminal that is applied to an example of a call according to the present disclosure, FIGS. 15a to 15d are schematic views illustrating a method for displaying data in a mobile terminal that is applied to an example of a text message check according to the present disclosure, FIGS. 16a to 16c are schematic views illustrating a method for displaying data in a mobile terminal that is applied to an example of a video phone call according to the present disclosure, FIGS. 17a to 17c are schematic views illustrating a method for displaying data in a mobile terminal that is applied to an example of a digital broadcasting according to the present disclosure, FIGS. 18a to 18c are schematic views illustrating a method for displaying data in a mobile terminal that is applied to an example of an Internet execution according to the present disclosure, FIGS. 19a to 19c are schematic views illustrating a method for displaying data in a mobile terminal that is applied to an example of an e-book according to the present disclosure, and FIGS. 20a to 20c are schematic views illustrating a method for displaying data in a mobile terminal that is applied to an example of a telephone menu according to the present disclosure.

As illustrated in FIG. 13a, the electronic paper 155 of the mobile terminal is illustrated with a camera album screen 200, and the light emitting display 151 is displayed with an image file 210 selected from the camera album.

At this time, in a case a power event such as a power-off occurs, the electronic paper 155 is displayed with an end message 220 reading as "The mobile terminal ends due to a low charged level of battery", as shown in FIG. 13b. The end message may be displayed on the light emitting display 151. Successively, as shown in FIG. 13c, the light emitting display 151 is turned off due to lack of power, the electronic paper 155 is displayed with the image file 210 displayed on the light emitting display 151.

FIGS. 14a to 14d are schematic views illustrating a method for displaying data in a mobile terminal that is applied to an example of a call according to the present disclosure.

As depicted in FIG. 14a, the electronic paper 155 is displayed with a telephone number input screen 300, and the light emitting display 151 is displayed with an inputted telephone number 310.

In a case a call key is selected, a line-busy screen 320 is displayed on the electronic paper 155, while the light emitting display is either turned off or turned on, as shown in FIG. 14b.

In a case a power event such as power-off occurs, the electronic paper 155 is displayed with an end message 330 reading as "The mobile terminal ends due to a low charged level of battery", as shown in FIG. 14c. The end message may be displayed on the light emitting display 151. Successively, as shown in FIG. 14d, the light emitting display 151 is turned off due to lack of power, the electronic paper 155 is displayed with the line-busy screen 320 displayed on the light emitting display 151. At this time, the user may check the telephone number of the other party who is busy on the line even if the mobile terminal is powered off.

FIGS. 15a to 15d are schematic views illustrating a method for displaying data in a mobile terminal that is applied to an example of a text message check according to the present disclosure.

As illustrated in FIG. 15a, the electronic paper 155 is displayed with a message reception screen 400, and the light emitting display 151 is displayed with a message reception notifying icon 410.

In a case the user selects a selection key, a message screen 420 is displayed on the electronic paper 155, and the light emitting display 151 is turned off or a message of the message screen is displayed, as shown in FIG. 15b. In a case a power event such as power-off occurs, the electronic paper 155 is displayed with an end message 430 reading as "The mobile terminal ends due to a low charged level of battery", as shown in FIG. 15c. The end message 430 may be displayed on the light emitting display 151.

Successively, as shown in FIG. 15d, the light emitting display 151 is turned off due to lack of power, and the electronic paper 155 is displayed with the message displayed on the light emitting display 151 or the message screen 440. At this time, the user may read a receiving message even if the power of the mobile terminal 100 is turned off.

FIGS. 16a to 16c are schematic views illustrating a method for displaying data in a mobile terminal that is applied to an example of a video phone call according to the present disclosure.

As shown in FIG. 16a, the light emitting display 151 is shown with a video phone screen 510 while the electronic paper 155 is turned off. However, the electronic paper 155 may be also displayed with the video phone screen. The video phone screen 510 may be displayed with a transmission image 511 photographed by the camera 121 of the mobile terminal 100 and a reception image 512 which is an image of the other party received through the wireless communication unit 110.

At this time, as shown in FIG. 16b, in a case a power event such as power-off occurs, the electronic paper 155 is displayed with an end message 520 reading as "The mobile terminal ends due to a low charged level of battery", as shown in FIG. 15c. The end message 520 may be displayed on the light emitting display 151. Successively, as shown in FIG. 16c, the light emitting display 151 is turned off due to lack of power, and the electronic paper 155 is displayed with at least one 530 of the transmission message displayed on the light emitting display 151 or the reception message.

FIGS. 17a to 17c are schematic views illustrating a method for displaying data in a mobile terminal that is applied to an example of a digital broadcasting according to the present disclosure.

As shown in FIG. 17a, the light emitting display 151 is shown with a broadcasting screen 610 while the electronic paper 155 is turned off. However, the electronic paper 155 may be also displayed with the broadcasting screen. The broadcasting screen 610 may be displayed with a broadcasting display 612 that displays the broadcasting and control items 614 that control the broadcasting.

At this time, as shown in FIG. 17b, in a case a power event such as power-off occurs, the electronic paper 155 is displayed with an end message 620 reading as "The mobile terminal ends due to a low charged level of battery". The end message 620 may be displayed on the light emitting display 151. Successively, as shown in FIG. 17c, the light emitting display 151 is turned off due to lack of power, and the electronic paper 155 is displayed with a broadcasting image 630 displayed on the light emitting display 151.

FIGS. 18a to 18c are schematic views illustrating a method for displaying data in a mobile terminal that is applied to an example of an Internet execution according to the present disclosure.

As illustrated in FIG. 18a, the light emitting display 151 is shown with an Internet screen 710 while the electronic paper 155 is turned off. However, the electronic paper 155 may be also displayed with the Internet screen.

At this time, as shown in FIG. 18b, in a case a power event such as power-off occurs, the electronic paper 155 is displayed with an end message 720 reading as "The mobile terminal ends due to a low charged level of battery". The end message 720 may be displayed on the light emitting display 151. Successively, as shown in FIG. 18c, the light emitting display 151 is turned off due to lack of power, and the electronic paper 155 is displayed with the Internet screen 730 displayed on the light emitting display 151.

According to the above-mentioned exemplary embodiments, the user can check the last Internet screen through the electronic paper 155 even if the Internet cannot be executed due to the insufficient battery power of the mobile terminal.

FIGS. 19a to 19c are schematic views illustrating a method for displaying data in a mobile terminal that is applied to an example of an e-book according to the present disclosure.

As illustrated in FIG. 19a, the light emitting display 151 is shown with a second e-book data 820 while the electronic paper 155 is displayed with a first e-book data 810. However, the second e-book data 820 displayed on the light emitting display 151 may be a data successive to the first e-book data, or part of the first e-book data.

At this time, as shown in FIG. 19b, in a case a power event such as power-off occurs, the electronic paper 155 is displayed with an end message 830 reading as "The mobile terminal ends due to a low charged level of battery". The end message 830 may be displayed on the light emitting display 151. Successively, as shown in FIG. 19c, the light emitting display 151 is turned off due to lack of power, and the electronic paper 155 may be displayed with the second e-book data displayed on the light emitting display 151. Alternatively, the first e-book data may be maintained as it is.

According to the present exemplary embodiment, the user can read a final e-book data through the electronic paper 155 even if there is no power on the mobile terminal.

FIGS. 20a to 20c are schematic views illustrating a method for displaying data in a mobile terminal that is applied to an example of a telephone menu according to the present disclosure.

As illustrated in FIG. 20a, the light emitting display 151 is shown with a phone menu 910 while the electronic paper 155 is turned off. However, the electronic paper 155 may be displayed with the phone menu.

At this time, as shown in FIG. 20b, in a case a power event such as power-off occurs, the electronic paper 155 is displayed with an end message 920 reading as "The mobile terminal ends due to a low charged level of battery". The end message 920 may be displayed on the light emitting display 151. Successively, as shown in FIG. 20c, the light emitting display 151 is turned off due to lack of power, and the electronic paper 155 may be displayed with the phone menu 930 displayed on the light emitting display 151.

Now, a detailed exemplary embodiment of a method for displaying data in a mobile terminal will be described in which a screen set up by a user is displayed on an electronic paper if a power event occurs which is the second exemplary embodiment of the present disclosure.

Figure 21:
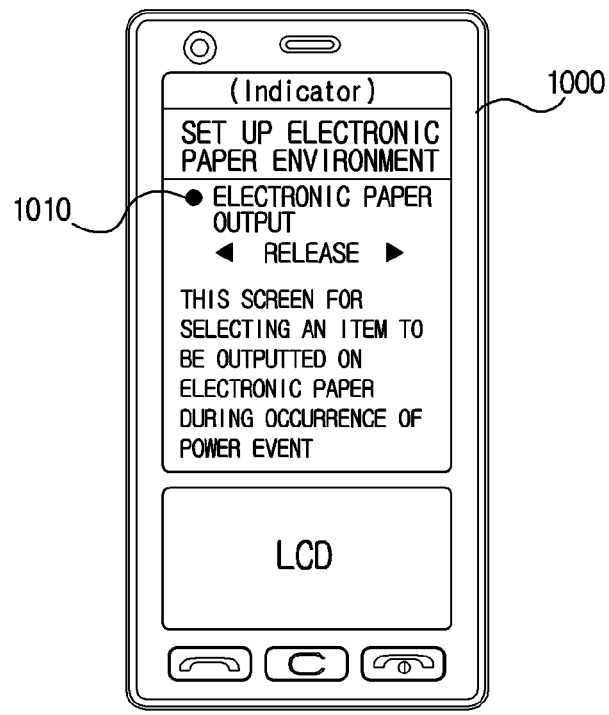
FIG. 21 is a schematic view illustrating a screen for setting up a method for displaying data according to the present disclosure.
Figure 23:
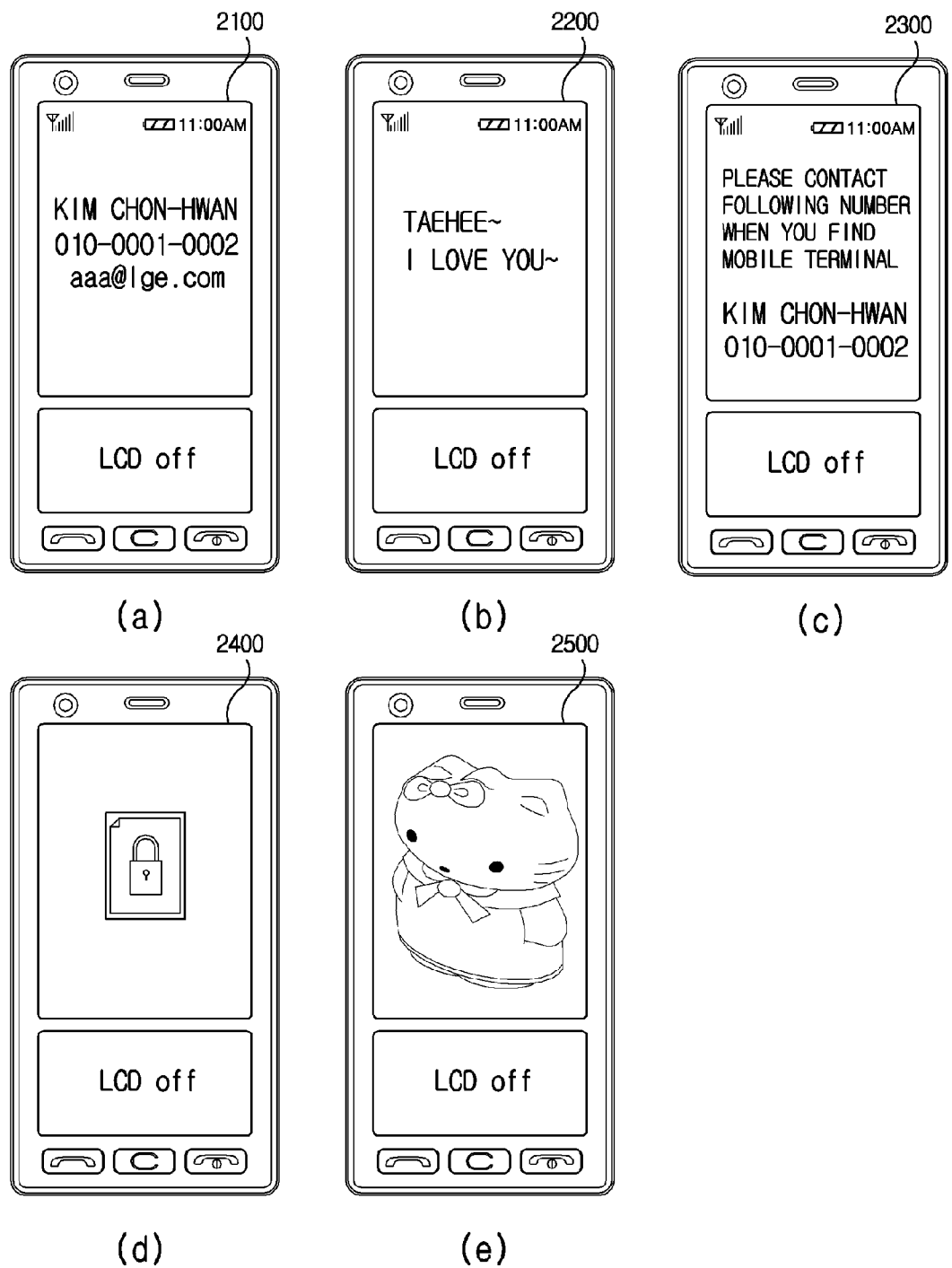
FIGS. 23a to 23e are schematic views illustrating a display screen by a user set-up applicable to a second exemplary embodiment of the present invention.
Figure 24:
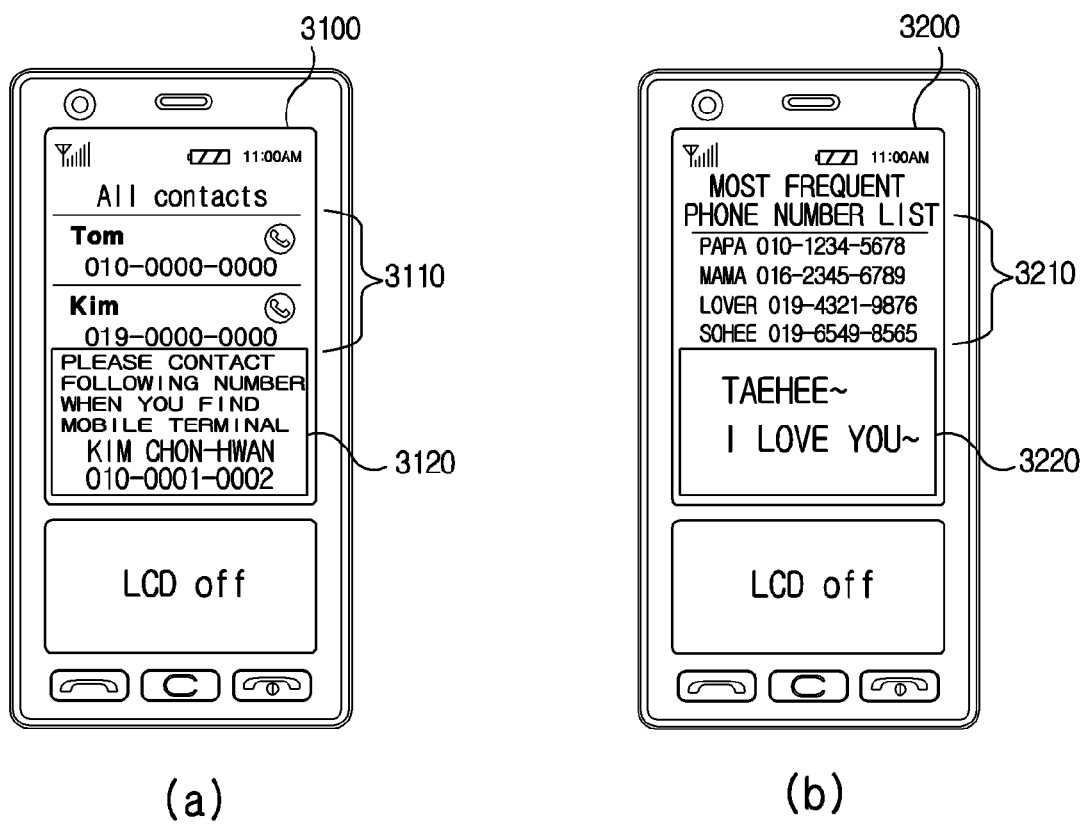
FIGS. 24a and 24b are schematic views illustrating examples of a combined display of user input information and a user set-up menu applicable to a second exemplary embodiment of the present invention.

FIG. 21 is a schematic view illustrating a screen for setting up a method for displaying data according to the present disclosure, FIGS. 22a to 22f are examples of set-up screens applicable to a second exemplary embodiment of the present invention, FIGS. 23a to 23e are schematic views illustrating a display screen by a user set-up applicable to a second exemplary embodiment of the present invention, and FIGS. 24a and 24b are schematic views illustrating examples of combined display of user input information and a user set-up menu applicable to a second exemplary embodiment of the present invention.

As illustrated in FIG. 21, a user displays an electronic paper environment set-up screen 1000 on the electronic paper 155 or the display through the user input unit 130 of the mobile terminal 100.

The user may set up a screen designated by the user during occurrence of power event or words through the user input unit 130 while the electronic paper environment set-up screen 1000 is displayed.

To be more specific, the user may set up a set-up and release of electronic paper output, a set-up of a screen to be outputted, an input of a word to be outputted, a set-up of an icon to be outputted or a set-up of pop-up menu, a menu screen to be outputted and an image to be outputted through the user input unit such as a navigation key while the electronic paper environment set-up screen 1000 is displayed on the display 151 or on the electronic paper 155.

Furthermore, the user may set up a screen to be displayed on the electronic paper through the user input unit 130 and the electronic paper environment set-up screen 1000, and may divisibly set up a display object (i.e., a portion to be displayed on the electronic paper) and a non-display object (i.e., a portion not to be displayed on the electronic paper) for the screen that is supposed to be displayed.

That is, for example, a specific object, a pop-up window or an icon is set up as a display object while others may be set up as a non-display object in one screen. In this case, only the display object is displayed on the electronic paper 155 during occurrence of a power event.

Figure 22:
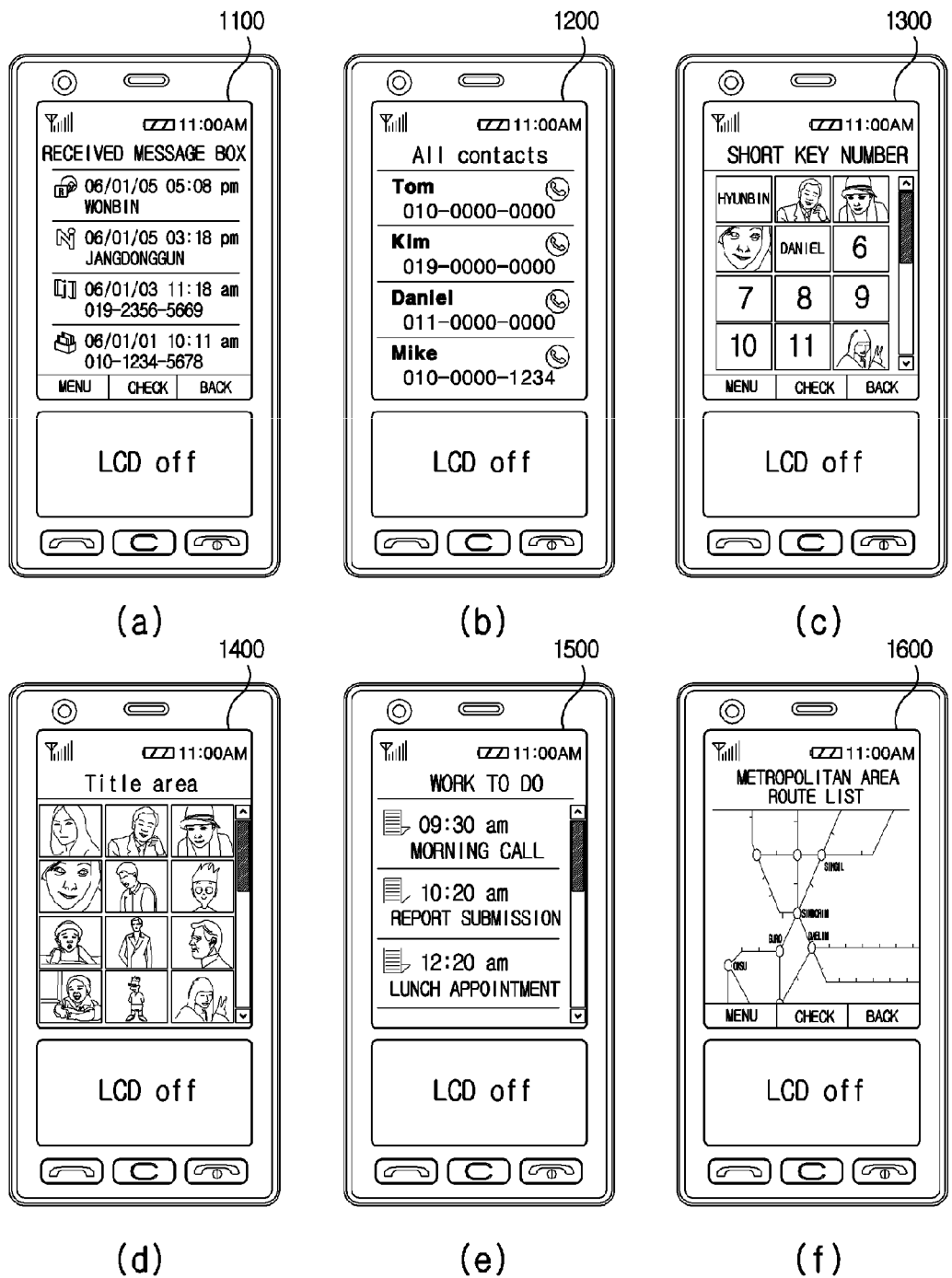
FIGS. 22a to 22f are examples of set-up screens applicable to a second exemplary embodiment of the present invention.

Now, detailed exemplary embodiments of displaying on the electronic paper during the occurrence of power event will be described with reference to FIGS. 22 and 23. If a screen to be displayed on the electronic paper 155 is set up during the occurrence of power event through the electronic paper environment set-up screen 1000, the controller controllably display the set-up screen on the electronic paper 155 during the occurrence of the power event.

FIGS. 22a to 22f are examples of set-up screens applicable to a second exemplary embodiment of the present invention.

A "screen to be displayed on the electronic paper 155 to be set up during the occurrence of power event" through the electronic paper environment set-up screen 1000 illustrated in FIG. 21 may include a reception message list screen 1100, a call list screen 1200, a short key number list 1300, a camera album menu screen 1400, a schedule screen 1500 and a subway route screen 1600, as shown in FIGS. 22a to 22f.

That is, the user may display on the electronic paper 155 the data stored in the memory 160 of the mobile terminal 100 during the occurrence of power event according to the need by the user. Therefore, the user can obtain necessary information from the mobile terminal even if there is no power on the mobile terminal.

FIGS. 23a to 23e are schematic views illustrating a display screen by a user set-up applicable to a second exemplary embodiment of the present invention.

FIG. 23a illustrates user information 2100 on the electronic paper, FIG. 23b shows words 2200 prepared by the user on the electronic paper, FIG. 23c shows contact-related information 2300 in case the mobile terminal is lost, FIG. 23d depicts an alternative icon 2400, and FIG. 23e shows an alternative image 2500 on the electronic paper.

That is, the electronic paper environment set-up screen 1000 illustrated in FIG. 21 includes a menu capable of inputting contents to be displayed on the electronic paper 155 during the occurrence of power event (not shown though). The user may display on the electronic paper 155 and through the menu a data pre-stored in the memory 160 or a data inputted by the user during the occurrence of power event.

FIG. 23a or 23c is very useful when the user loses the mobile terminal. The data displayed on FIG. 23d or 23e are very useful for designing of a mobile terminal.

FIGS. 24a and 24b are schematic views illustrating examples of a combined display of user input information and a user set-up menu applicable to a second exemplary embodiment of the present invention.

FIG. 24a illustrates a combined display of a call list 3110 and loss information 3120 on the electronic paper 155, and FIG. 24b illustrates a combined display of a most frequent call list 3210 and a private input word 3220 on the electronic paper.

The electronic paper environment set-up screen 1000 illustrated in FIG. 21 includes a menu configured to input contents to be displayed on the electronic paper 155 during the occurrence of power event. The user may simultaneously display on the electronic paper 155 and through the menu a data pre-stored in the memory 160 and a data inputted by the user during the occurrence of power event.

At this time, the data inputted by the user, i.e., the private input word 3220 or the loss information 3120 may be displayed on the pop-up window. According to the present exemplary embodiment, the user can obtain more information from the mobile terminal that is out of power.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The mobile terminal disposed with electronic paper and a method for displaying data in the mobile terminal according to the present disclosure may, however, be embodied in many different forms and should not be construed as limited to the embodiments set forth herein. While particular features or aspects may have been disclosed with respect to several implementations, such features or aspects may be selectively combined with one or more other features and/or aspects of other embodiments as may be desired.

What is claimed is:

1. A mobile terminal, comprising:
   a first display configured to display data according to a user input, the first display including a light-emitting display;
   a second display including an electronic paper display; and
   a controller configured to:
      detect a power-related event of the mobile terminal, the power-related event including a power-off event, a power-insufficient event or a power-saving event,
      control the first display to be powered off in response to the detection of the power-related event, and
      control the second display to display at least a portion of the data displayed on the first display in response to the detection of the power-related event.

2. The mobile terminal of claim 1, wherein the controller is further configured to detect a movement event related to the mobile terminal.

3. The mobile terminal of claim 1, wherein the controller is further configured to detect a wake-up event and to provide wake-up data to be displayed on either the first or second displays when the wake-up event is detected.

4. The mobile terminal of claim 3, wherein the second display has a higher priority than the first display to display the wake-up data when the wake-up event is detected.

5. The mobile terminal of claim 3, wherein the wake-up data comprises a text message reception, a voice call reception, a video call reception, a folder-open, a slider-open, or a side key input.

6. The mobile terminal of claim 3, further comprising:
   a light emitting unit, disposed at one side of the second display and configured to illuminate the second display and wherein the controller is further configured to enable the light emitting unit when the wake-up event is detected.

7. The mobile terminal of claim 6, wherein the wake-up data displayed on the second display becomes visible when the light emitting unit is activated to emit light to the second display.

8. The mobile terminal of claim 1, further comprising:
   a movement detecting sensor configured to detect movement of the mobile terminal, wherein the controller is configured to control the second display to display the at least the portion of the data displayed on the first display when movement of the mobile terminal is detected by the movement detecting sensor.

9. The mobile terminal of claim 1, further comprising:
   a solar cell configured to supply power to the second display.

10. The mobile terminal of claim 9, wherein the solar cell is a transparent solar cell that is disposed on either the first or second display.

11. The mobile terminal of claim 1, further comprising:
    a memory unit configured to store a predetermined menu and wherein the controller is further configured to execute the predetermined menu to provide a display object from the predetermined menu to be displayed on the second display.

12. The mobile terminal of claim 11, further comprising:
    a user input unit for setting a set-up display object to be displayed on the second display during occurrence of the power-related event and wherein the controller is further configured to control the second display to display the set-up display object.

13. The mobile terminal of claim 12, wherein the set-up display object includes at least a recent message receipt list, a current phonebook list, a recent call list, telephone information of the mobile terminal, a user description word, map information, schedule information, an image file, or Internet information.

14. The mobile terminal of claim 11, wherein the predetermined menu includes at least an image call menu, a message reception menu, a telephone call, a mobile digital broadcasting menu, a camera album menu or an electronic book (e-book) menu.

15. The mobile terminal of claim 11, wherein the display object includes at least a photograph image captured by a camera corresponding to the predetermined menu, a text message, call information, an image received from a broadcasting module, an image file, or electronic book (e-book) data.

16. The mobile terminal of claim 1, wherein the controller is further configured to display a notification message on a portion of the second display indicating a status of the mobile terminal when the event is detected.

17. A mobile terminal, comprising:
    a first body including a first display formed with a light emitting display and a first connector, the first display configured to display data according to a user input;
    a second body including a second display formed with an electronic paper display and a second connector configured to connect to the first connector, wherein the second body is non-permanently coupled to the first body via the first and second connectors; and a controller configured to control the second display to display at least a portion of the data displayed on the first display upon detecting the first body detached from the second body.

18. The mobile terminal of claim 17, wherein the second body further comprises a third display formed with a light emitting display and configured to display data and the controller is further configured to control the second display to display at least a portion of the data displayed on the first display and at least a portion of the data displayed on the third display as combined data when a folder-close event is detected.

19. The mobile terminal claim 18, wherein the controller is further configured to separate the at least the portion of the data displayed on the second displayed into first and second data portions such that the first data portion is displayed on the first display and the second data portion is displayed on the third display when a folder-open event is detected.

20. The mobile terminal of claim 18, wherein the controller is further configured to separate the combined data into first and second data portions such that the first data portion is displayed on the first display and the second data portion is displayed on the third display when a subsequent folder-open event is detected.

21. A method for displaying data in a mobile terminal, the method comprising:

displaying data according to a user input on a first display of the mobile terminal, the first display including a light emitting display;

detecting a power-related event of the mobile terminal, the power-related event including a power-off event, a power-insufficient event or a power-saving event;

powering off the first display in response to the detection of the power-related event; and displaying at least a portion of the data displayed on the first display on a second display including an electronic paper display in response to the detection of the power-related event.

22. The method of claim 21, further comprising:
detecting a movement-related event of the mobile terminal.

23. The method of claim 21, wherein displaying the data according to the user input comprises monitoring a power supply of the mobile terminal for detecting the power-related event while receiving the user input.

24. The method of claim 21, wherein the second display receives power from a solar cell disposed on the mobile terminal.

25. The method of claim 21, further comprising:
displaying a notification message on a portion of the second display indicating a status of the mobile terminal when the power-related event is detected.

26. The method of claim 21, further comprising:
powering on a light emitting unit disposed on one side of the second display when a wake-up event is detected.

27. The method of claim 21, further comprising:
executing a predetermined menu at the mobile terminal; and displaying at least one display object related to the predetermined menu on the second display.

28. The method of claim 21, further comprising:
presetting a set-up display object; and
displaying the preset set-up display object on the second display when the power-related event is generated by a user set-up.

* * * * *